US 8,967,555 B2

(12) United States Patent
Smith

(10) Patent No.: US 8,967,555 B2
(45) Date of Patent: Mar. 3, 2015

(54) PORTABLE ELECTRIC CABLE SUPPORT TOWER

(71) Applicant: Roger A Smith, Apollo Beach, FL (US)

(72) Inventor: Roger A Smith, Apollo Beach, FL (US)

(*) Notice: Subject to any disclaimer, the term of this patent is extended or adjusted under 35 U.S.C. 154(b) by 0 days.

(21) Appl. No.: 13/967,898

(22) Filed: Aug. 15, 2013

(65) Prior Publication Data

US 2013/0327899 A1     Dec. 12, 2013

Related U.S. Application Data

(63) Continuation of application No. 13/285,437, filed on Oct. 31, 2011, now abandoned.

(60) Provisional application No. 61/428,891, filed on Dec. 31, 2010.

(51) Int. Cl.
*F16M 11/00* (2006.01)
*F16L 3/00* (2006.01)
*H02G 3/30* (2006.01)

(52) U.S. Cl.
CPC ... *F16L 3/00* (2013.01); *H02G 3/30* (2013.01)
USPC .......................................... 248/68.1; 248/73

(58) Field of Classification Search
USPC ........ 248/125.8, 121, 125.1, 125.9, 161, 157, 248/177.1, 49, 65, 70, 74.1, 68.1, 73, 67.7, 248/507, 508, 910, 519, 520
See application file for complete search history.

(56) References Cited

U.S. PATENT DOCUMENTS

| | | | | |
|---|---|---|---|---|
| 3,355,136 A | * | 11/1967 | Staples | 248/352 |
| 5,058,838 A | * | 10/1991 | Velke et al. | 248/50 |
| 6,305,117 B1 | * | 10/2001 | Hales, Sr. | 42/94 |
| 6,644,601 B2 | * | 11/2003 | Aussiker | 248/49 |
| 6,986,496 B2 | * | 1/2006 | Roberts et al. | 248/519 |
| 7,240,885 B1 | * | 7/2007 | Sullivan | 248/354.1 |
| 7,387,171 B2 | * | 6/2008 | Keeler | 168/44 |
| 7,738,245 B1 | * | 6/2010 | Stifal | 361/679.21 |
| 8,113,479 B1 | * | 2/2012 | O'Connell | 248/351 |
| 2004/0169114 A1 | * | 9/2004 | Dierkes | 248/165 |

* cited by examiner

*Primary Examiner* — Steven Marsh
(74) *Attorney, Agent, or Firm* — Waters & Oppenhuizen PLC; David L. Oppenhuizen

(57) ABSTRACT

A support for electrical cables having a nonconductive telescoping pole. A frictional locking collar couples sections of the telescoping pole to one another. The bottom end of the pole fits into a round conical base formed of recycled tires. The top end of the pole is affixed to a nonconductive head that is shaped to cradle electrical cables.

8 Claims, 2 Drawing Sheets

PORTABLE ELECTRIC CABLE SUPPORT TOWER

CROSS REFERENCE TO RELATED APPLICATION

This application is a continuation of Applicant's co-pending Application No. 13,285,437, filed Oct. 31, 2011, which claims the domestic priority benefit of provisional application number 61/428,891, filed Dec. 31, 2010. The priority applications are incorporated herein by reference, in their entirety, for all purposes.

FIELD OF THE INVENTION

The present invention is directed generally to a support structure, and more specifically to a support pole that securely holds electrical cables a safe distance above ground level.

BACKGROUND INFORMATION

Workplace safety practices include the practice of keeping electrical cables (welding cables, power cords, and so forth) suspended so that they are not in contact with the ground and are not likely to come into contact with a worker. This safety practice is advisable because of the risk that some portion of a worker's body may complete an electrical circuit if the worker is standing on the ground and touches a cable, or if the ground itself is in electrical contact with an electrical cable.

A traditional way to keep electrical cables off the ground on a work site is to use lengths of lumber nominally 2 in. by 4 in. in cross section (for example, common 8 foot long two-by-four "studs") to prop the cables overhead. One disadvantage of using lumber to prop up cables is that each tower is constructed onsite, requiring time consuming rough carpentry to add a base to each vertical board. Hooks to suspend the cables are formed by nails driven partially into the top of the tower, a less-than-ideal situation since it would be preferable for all parts of the tower to be nonconductive. These lumber towers are only marginally effective because they are prone to falling over due to a high center of gravity.

The lumber towers are awkward to move and are almost never moved from one job site to another. They are so inconvenient to move and/or store that construction 2 companies routinely dispose of them when a job is completed, and accept that new ones will need to be constructed at future construction sites. This is a waste of resources, a drag on productivity, and an economically inefficient recurring cost.

What is needed is a support structure that will hold electrical cables overhead safely, and that is inexpensive, lightweight, reusable, and convenient to move and store.

SUMMARY OF THE INVENTION

One aspect of the present invention is cable support tower that has a vertical nonconductive pole.

Another aspect of the present invention is the use of a fiberglass, telescoping pole in a cable support tower.

Yet another aspect of the present invention is a cable support tower that has a telescoping nonconductive pole with a frictional locking collar between telescoping sections.

Still another aspect of the present invention is a cable support tower having a dense base with a low center-of-gravity.

A further aspect of the present invention is a cable support tower that has a base formed substantially of recycled tire rubber.

Another aspect of the present invention is a cable support tower that has a top shaped to cradle plural electrical cables.

One embodiment provides support for electrical cables using a nonconductive telescoping pole. A frictional locking collar couples sections of the telescoping pole to one another. The bottom end of the pole fits into a round conical base formed of recycled tires. The top end of the pole is affixed to a head that is shaped to cradle electrical cables. Fiberglass, plastic, and carbon fiber composite are examples of nonconductive material suitable for the pole.

According to some embodiments of the portable support tower, the tower has a non-conductive base, a tubular pole member, and a support head. The non-conductive base has a bottom that engages the ground and a top wherein an opening extends downwardly from the top toward the bottom. The base is formed of a material derived from shredded, recycled rubber tire material, and the base is sufficiently wide and heavy that it resists being tipped over by application of a tipping force. The base is also sufficiently light that only one person can move it without exceeding permitted safe practice.

The tubular pole member is elongated and lightweight, has a lower end and an upper end, and is formed of a nonconductive material comprising that includes synthetic resin. The pole member fits closely in the opening in the base so that it is supported in an upward position by the base, while the pole is removable from the base for disassembly and moving.

The support head is removably mounted at the upper end of the pole. The support head includes structure for engaging and supporting one or more electrical cables above the ground. The support tower is constructed so as to provide stable and non-conductive above ground support for electrical cables and is capable of being easily disassembled and moved and reused at different work sites.

DETAILED DESCRIPTION

Figure 1:
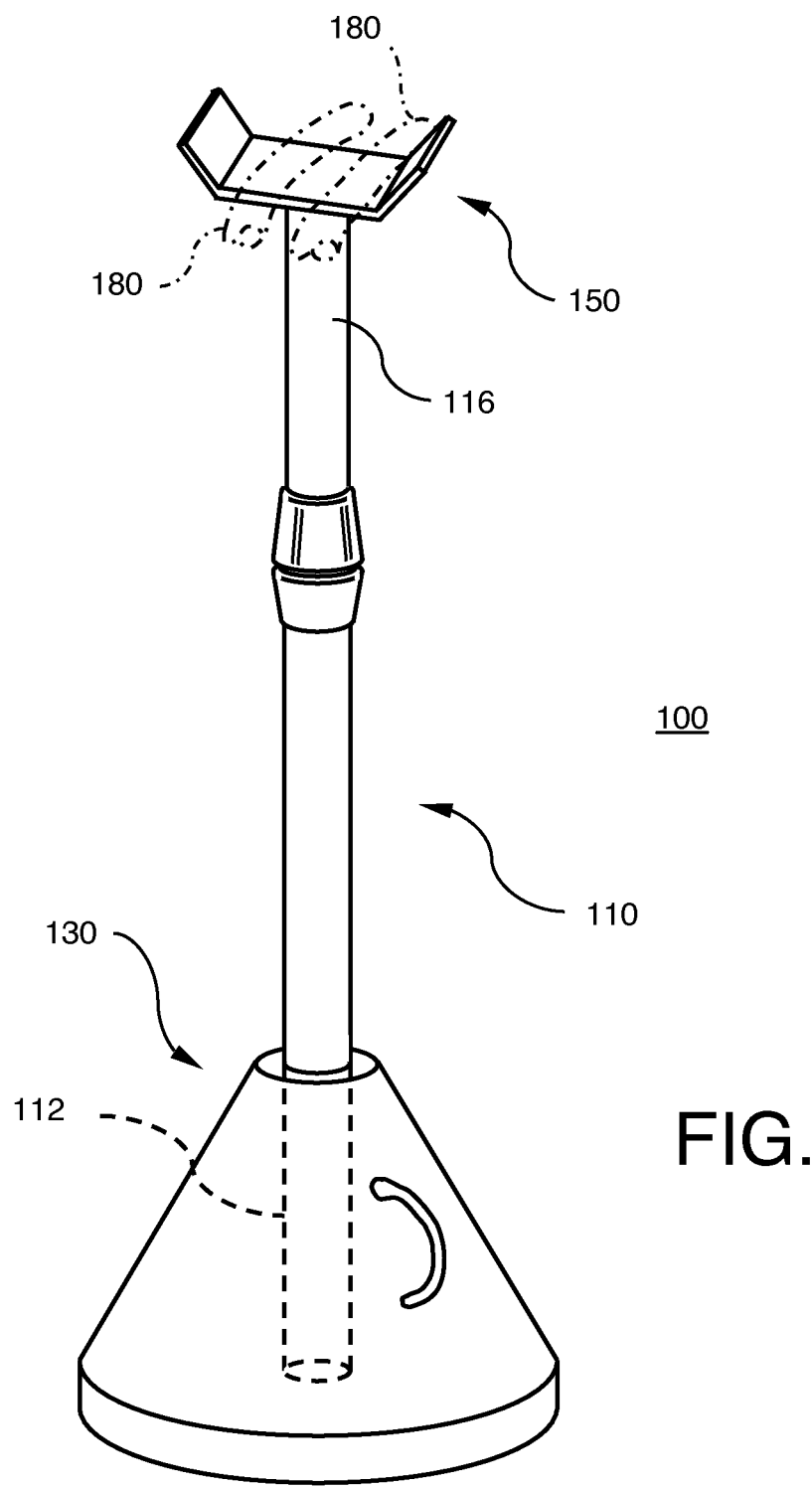
FIG. 1 shows a perspective view of a cable support according to an embodiment of the present invention.

Referring to FIG. 1, a perspective view of one cable support embodiment is shown. A nonconductive telescoping pole 110 is oriented substantially vertically to provide vertical structural support. The bottom end 112 of the pole 110 fits into a round, conical base 130 that is substantially heaver than the pole 110. The top end 116 of the pole 110 is affixed to a head 150 that is shaped to cradle electrical cables. Together, the pole 110, base 130, and head 150 form a tower 100 that provides support for electrical cables 180 to keep the cables suspended above the ground.

Figure 2:
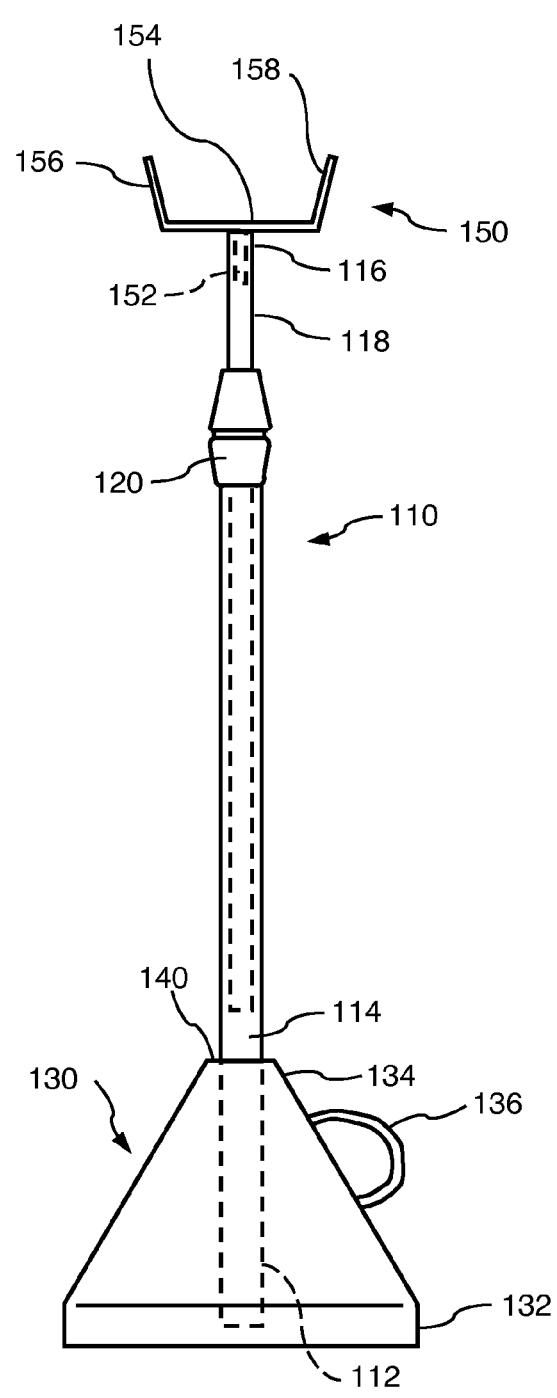
FIG. 2 shows an elevation view of a cable support according to the embodiment shown in FIG. 1.

Referring to FIG. 2, an elevation view of the tower 100 embodiment of FIG. 1 is shown. An inner, top section 118 of the telescoping pole 110 is slidably engaged and disposed partially inside an outer, bottom section 114. The slidable engagement of the pole top section 118 with the pole bottom section 114 is subject to selectable locking of the sections 114, 118 into fixed engagement by a frictional locking collar 120. The relative position of the pole sections 114, 118, when locked into fixed engagement, is selectable across a broad range from fully collapsed to fully extended. The pole 110 is fiberglass and the frictional locking collar 120 is nonconductive hard plastic.

An advantageous way to affix the locking collar 120 to the bottom pole section 114 is by threaded engagement of threads formed on the outside surface of the locking collar 120 engaging with threads formed on the interior surface of the bottom pole section 114. A Teflon® (polytetrafluoroethylene) taper collar is compressed between the collar 120 and the pole section 114 to hold the threaded engagement securely.

The base 130 provides stability for the tower 110 by being substantially heavier than the pole 110, and by having a form factor that gives the base 130 a low center of gravity. The relative weight (or mass) of the pole 110 (minimized) and the base 130 (maximized) is selected by choice of material and form factor. The pole 110 is chosen to be lightweight fiberglass (or alternatively, polymer, carbon fiber composite) and to be hollow through both the top and bottom sections 114, 118. The base 130 is formed of recycled tire rubber (or another dense nonconductive material) with internal vanes (not shown) of a thickness that may not be strictly necessary for structural integrity but provide the advantage of extra stabilizing mass. A practical limit to increasing the mass of the base 130 is to stay beneath a single worker carry limit, for example the 75-pound limit enforced by Occupational Safety and Health Administration (OSHA) in the US. A commercially available traffic sign base formed of recycled rubber is suitable for use as the base for embodiments of a cable support tower according to the present invention.

The base 130 is formed to have a low center-of-gravity by having substantially more of the mass nearer the bottom 132 than the top 134. The round, conical shape (or frustoconical shape, to be precise) of the base 130 well suits this approach. Other shapes may also be suitable, so that an alternative embodiment may have a pyramidal base. The lower end of the base is wide enough to prevent the pole from tipping over in normal usage, and the base is high enough to hold the pole securely in a vertical position. In the preferred embodiment, the base is about eighteen inches wide and about fourteen inches tall. These dimensions can be varied.

The base 130 has a handle 136 for ease of carrying by a worker. The handle is formed of nonconductive, flexible rope material. So long as it is nonconductive, the rope used to form the handle 136 can be made from polymer or fibers (e.g., manila, hemp, sisal).

A channel 140 is formed in the base 130, and has a diameter sufficiently large to accommodate the bottom end 112 of the pole 110. The channel 140 is closed at the bottom 132 of the base 130 to prevent the pole 110 from sliding down through the base 130 in the event the tower 100 is placed on soft ground.

The head 150 has a stem 152, a bottom 154, and sides 156, 158. The stem 152 extends downward from the bottom 154 and is threadably engaged with the top end 116 of the pole 110. The bottom 154 has a width sufficient to accommodate plural cables, 10 inches. The sides 156, 158 extend upwardly from opposing ends of the bottom 154, and have length of 8 inches, sufficient to prevent cables from sliding off of the head 150.

Figure 3:
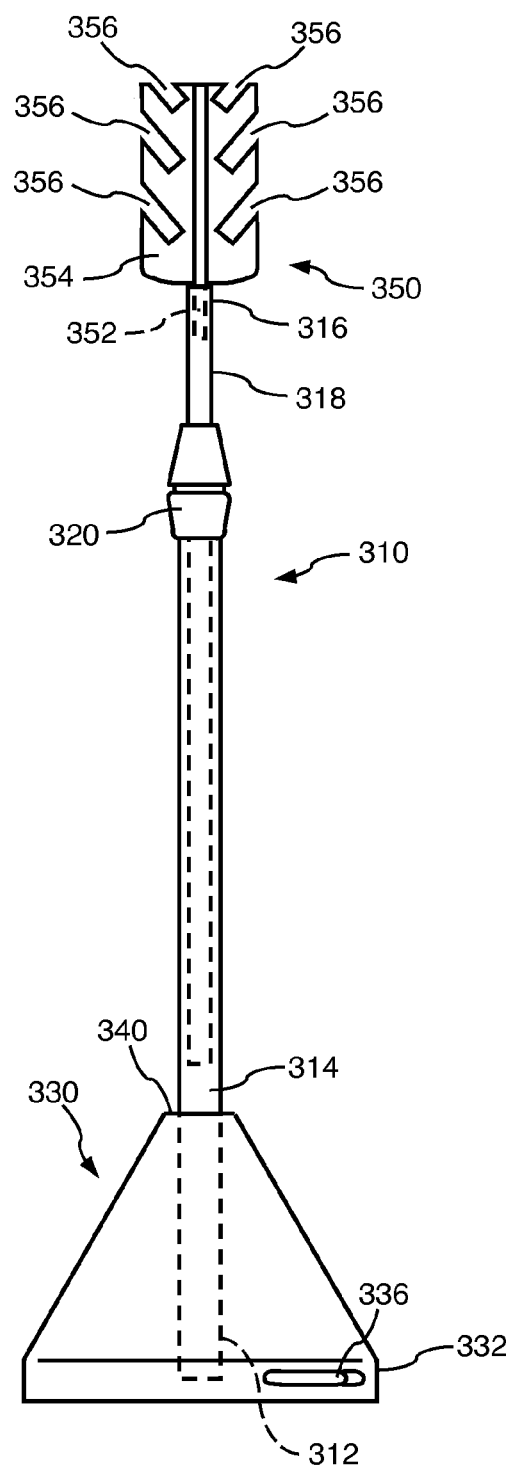
FIG. 3 shows an elevation view of a cable support according to another embodiment of the present invention.

Referring to FIG. 3, an elevation view of a cable support according to another embodiment is shown. An inner, top section 318 of the telescoping pole 310 is slidably engaged and disposed partially inside an outer, bottom section 314. The slidable engagement of the pole top section 318 with the pole bottom section 314 is subject to selectable locking of the sections 314, 318 into fixed engagement by a frictional locking collar 320. The relative position of the pole sections 314, 318 when locked into fixed engagement is selectable across a broad range from fully collapsed to fully extended. The pole 310 is made of polymer and the frictional locking collar 320 is nonconductive hard plastic.

The embodiments described have shown two section telescoping poles, however, practice of the invention is not limited to poles with that number of sections. According to an alternate embodiment the pole has a single, fixed length (i.e., non-telescoping) section. In the case a single-section pole is used, the length of the pole is selected so as to keep the supported cables seven to eight feet above the ground. According to other alternative embodiments, the telescoping pole may have three or more sections. In the case of multiple-section poles, the fully collapsed pole length should five feet or less, for ease of portability and storage, and the fully extended pole length should be at least seven feet to provide for a safe height of suspension for cables. A suitable outer diameter of a two-section telescoping pole is about two inches.

The base 330 provides stability for the tower 300 by being substantially heavier than the pole 310, and by having a form factor that gives the base 330 a low center-of gravity. The ratio of weight of the base 330 to that of the pole 310 is maximized by choice of material and form factor. The pole 310 is formed of a rigid, nonconducting, lightweight, material that (examples are: fiberglass, polymer, carbon fiber composite) and is made to be hollow through both the top and bottom sections 314, 318. The base 330 of this embodiment is similar in form and composition to the base 130 of the embodiment of FIGS. 1 and 2, and has a functional/structural relationship with its pole 310 similar to that described regarding the base 130 and pole 110 of the embodiment of FIGS. 1 and 2.

A handle 336 is provided by forming an oblong recess of approximately 1 inch by 5 inch through a side surface of the base. A channel 340 is formed in the base 330, and has a diameter sufficiently large to accommodate the bottom end 312 of the pole 310. The channel 340 is closed at the bottom 332 of the base 330 to prevent the pole 310 from sliding down through the base 330 in the event the tower 300 is placed on soft ground.

The head 350 has a stem 352, a body 354, and recesses 356 formed in opposed edges of the body. The stem 352 extends downward from the body 354 and is threadably engaged with the top end 316 of the pole 310. Each of the recesses 356 has a width sufficient to accommodate at least one cable. The depth of each recess 356 is sufficient to prevent cables from sliding off of the head 350. In this embodiment, four recesses 356 are shown, but the number is not critical to practice of the invention. In general, two or more recesses would be appropriate for alternative embodiments. The head 350 is formed of plastic or other suitable materials that include (without limitation) plastic, carbon fiber, fiberglass, and ceramic. The head 350 can also be formed using a metal (e.g., steel or aluminum) that is entirely covered on all exposed surfaces with a nonconductive coating (e.g., plastic or rubber) of substantial thickness.

Suitable materials for the pole structure have been listed above, the listed materials not be considered as limiting, except to note that PVC (polyvinylchloride) pipe is not considered to be suitable for the pole because under cold conditions PVC has a tendency to become brittle, presenting a risk of failure due to cracking and/or breaking.

According to an alternate embodiment, the base is formed of a rigid walled plastic container partially filled with sand (or another dense, flowable, nonconductive solid material, such as gravel). A practical limit to how much sand or gravel to add to increase the mass of the hollow plastic base is to stay beneath the 70-pound carry limit for a single worker.

What is claimed is:

1. A portable support tower for temporarily supporting one or more electrical cables above ground level at a construction site, the support tower comprising:

an elongated lightweight vertical support member having a proximal end and a distal end, the elongated lightweight member being formed of a nonconductive, rigid first material;

a base having a downwardly-extending cavity formed therein, the cavity being sized to accept the proximal end of the elongated lightweight member, the base being formed of a nonconductive second material that provides the base with substantially more mass than the first material provides the lightweight member; and a cable support head removably affixed to the distal end of the vertical support member, the support head comprising a body having edges, with two or more cable support recesses formed in one or more edges thereof, each recess having an open outer end at a side of the support head, in which a cable can be inserted laterally, and an inner end positioned lower than the outer end, such that cables inserted therein are urged to remain in the recesses.

2. The support tower of claim 1, wherein the first material is selected from the group consisting of: plastic, fiberglass, and carbon fiber composite.

3. The support tower of claim 1, wherein the elongated lightweight vertical support member comprises:

a hollow bottom portion; and a top portion sized to move freely inside the hollow bottom portion; and wherein the support tower further comprises a frictional locking collar disposed to encompass both the hollow bottom portion and the top portion and to selectably lock the hollow bottom portion and the top portion in fixed relation to one another.

4. The support tower of claim 1, wherein the second material comprises shredded, recycled tire rubber.

5. The support tower of claim 1, wherein the support head is affixed to the distal end of the elongated lightweight member via threaded engagement.

6. The support tower of claim 1 wherein the support head comprises a substantially flat body, the body having two opposed edges, at least one of the recesses being formed in each opposed edge.

7. A portable support tower for temporarily supporting one or more electrical cables above ground level at a construction site, the support tower comprising:

a non-conductive base having a bottom that engages the ground and a top that extends upwardly therefrom, the base having an opening therein extending downwardly from the top toward the bottom, the base being formed of a material comprising a shredded, recycled rubber tire material, the base being sufficiently wide and heavy that it resists being tipped over by a tipping force applied thereto, the base being sufficiently light that a single person is permitted by law to move it;

an elongated, lightweight tubular pole member having a lower end and an upper end, the pole member being formed of a nonconductive material comprising a synthetic resin, the pole member fitting closely in the opening in the base so as to be supported in an upward position by the base, the pole being removable from the base for disassembly and moving the tower; and a non-conductive support head removably affixed to the upper end of the pole, the support head including a body having side edges on opposite sides of a central axis, each side edge having one or more recesses formed therein for engaging and supporting one or more electrical cables above the ground, the recesses extending inwardly and downwardly in the side edges to an inner end adjacent the axis of the support head so as to urge cables placed therein to nest in the ends of the recesses adjacent to the axis;

the support tower being constructed so as to provide stable and non-conductive above ground support for electrical cables but being capable of being easily disassembled and moved and reused at different sites.

8. The support tower of claim 7 wherein the support head is formed of a generally flat non-conductive plate and has a stem extending from a lower end thereof that is mounted in the upper end of the pole.

* * * * *